(12) United States Patent
Reinelt et al.

(10) Patent No.: US 6,609,539 B2
(45) Date of Patent: Aug. 26, 2003

(54) HYDRAULICALLY OPERATED DIRECTIONAL CONTROL VALVE

(75) Inventors: Werner Reinelt, Bochum (DE); Michael Dettmers, Kamen (DE); Wolfgang Kobow, Wuppertal (DE)

(73) Assignee: DBT GmbH (DE)

( * ) Notice: Subject to any disclaimer, the term of this patent is extended or adjusted under 35 U.S.C. 154(b) by 0 days.

(21) Appl. No.: 09/960,579

(22) Filed: Sep. 21, 2001

(65) Prior Publication Data
US 2002/0069920 A1 Jun. 13, 2002

(30) Foreign Application Priority Data
Sep. 22, 2000 (DE) .......................... 100 47 073

(51) Int. Cl.⁷ ............................. F15B 13/042
(52) U.S. Cl. .................. 137/625.66; 137/625.27
(58) Field of Search ................. 137/625.27, 625.66

(56) References Cited

U.S. PATENT DOCUMENTS

| | | | | |
|---|---|---|---|---|
| 172,492 A | * | 1/1876 | Prall | 137/625.27 |
| 2,913,005 A | * | 11/1959 | Grant et al. | 137/625.6 |
| 3,921,660 A | * | 11/1975 | Kowalski | 137/625.66 |
| 4,011,892 A | * | 3/1977 | Kowalski | 137/625.66 |
| 4,098,295 A | * | 7/1978 | Haytayan | 137/625.27 |
| 4,887,643 A | * | 12/1989 | Tomlin et al. | 137/625.66 |
| 5,878,782 A | * | 3/1999 | Nakajima | 137/625.65 |

FOREIGN PATENT DOCUMENTS

DE     197 08 741 A1   *   9/1998

* cited by examiner

Primary Examiner—Gerald A. Michalsky
(74) Attorney, Agent, or Firm—Cook, Alex, McFarron, Manzo, Cummings & Mehler, Ltd.

(57) ABSTRACT

In the directional control valve (10) for support mechanisms in underground mining, the valve piston (16) is guided seal free in the valve seat carrier (15) between the high pressure connection (P) and a sealing ring (22) and thus permits an overflow of high pressure fluid from the high pressure connection (P) to the return flow connection (T) on opening the valve (10). The valve (10) thus achieves an opening and closing characteristic with negative overlapping and so provides gentle switching processes, so that switching impacts with high pressure peaks do not arise.

16 Claims, 1 Drawing Sheet

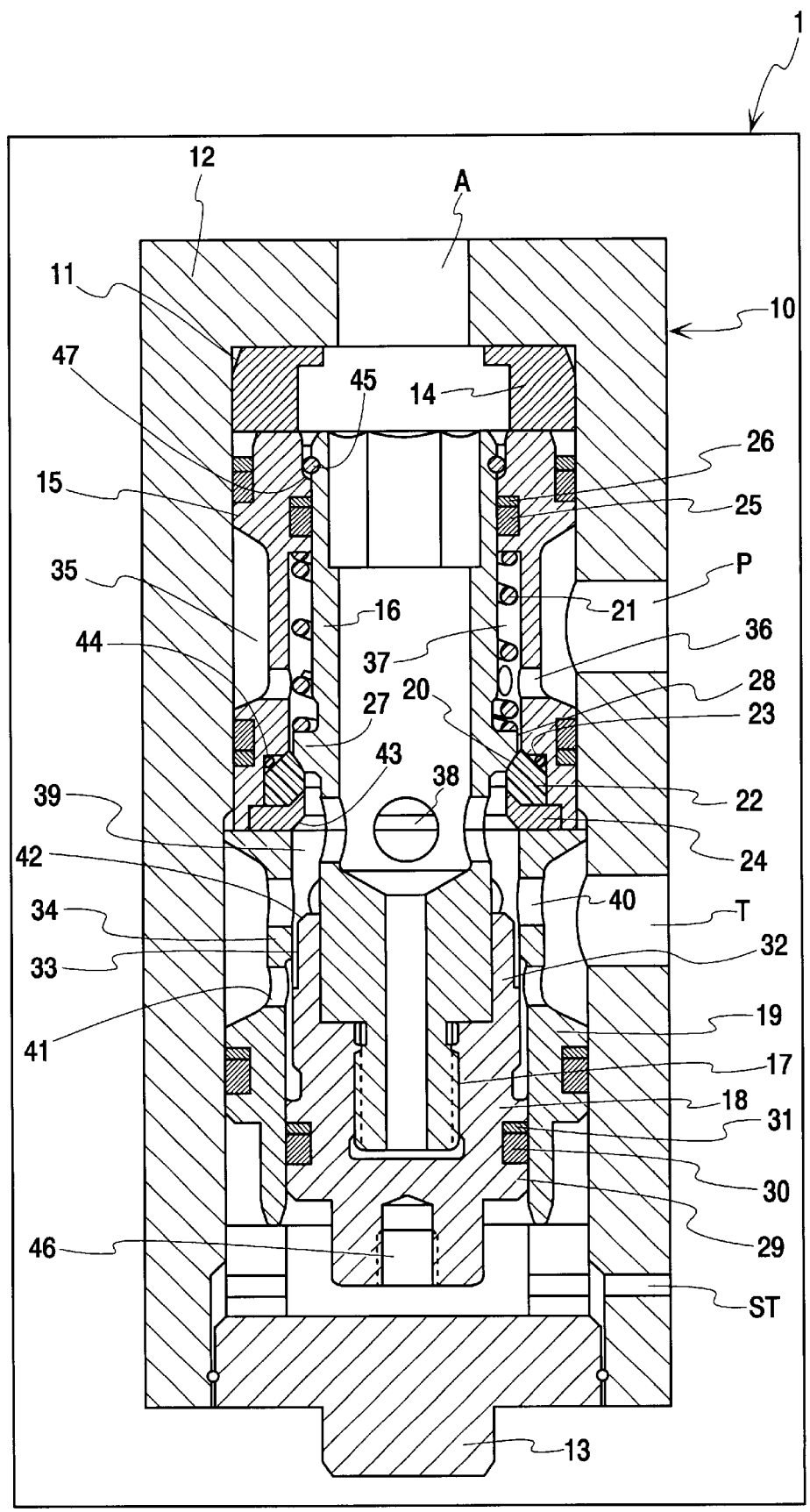

HYDRAULICALLY OPERATED DIRECTIONAL CONTROL VALVE

The present invention relates to a hydraulically operated directional control valve for support mechanisms in underground mining, with a valve piston guided sliding in a boring of a valve seat carrier with a valve cone to abut in a sealing manner a sealing ring arranged in the valve seat carrier and with a control piston guide for the actuation of the valve piston accommodated so as to slide in a control piston, with a high pressure connection, a load connection, a return flow connection and a control pressure connection for hydraulic fluid, whereby on actuation of the valve piston by the control piston the return flow connection can be closed by a closing element of the control piston and following the lifting of the valve cone from the sealing ring a fluid connection can be set up from the high pressure connection to the load connection.

Pressure controlled direction control valves of this construction find application in underground mining in advancing support frames, to extend and retract their hydraulic cylinders. The high hydraulic pressures and the frequently repeated operating processes in ongoing support operations lead to high pressure change loadings in directional control valves, which have the consequence of a high degree of wear especially on the sealing surfaces of the valves.

A 3/2 directional control valve of the construction described in the opening paragraph is proposed in DE 197 08 741 A1, which operates with positive overthrust. This means that the feed to the high pressure connection of the valve is only opened when the return flow connection is fully closed. On operating the previously proposed valve, pressure spikes of up to 1000 bar can arise, which cause a very hard switching and can lead to the cartridge coupling of the valve being loosened or damaged and after only a comparatively short operating time damage occurs to the static seals of the valve cartridge. The previously proposed valve requires a high control pressure of some 230 bar, whereby also the wear is undesirably high on the control piston side.

It is the aim of the present invention to produce a directional control valve of the construction described in the opening paragraph in which the opening and closing proceeds without hard switching processes and thus with substantially reduced wear, without the security of switching being negatively influenced thereby.

Accordingly the present invention is directed to a hydraulically operated directional control valve as set out in the opening paragraph of the present specification, in which the valve piston is guided without sealing between the high pressure connection and the sealing ring in the valve seat carrier and in which the closing element of the control piston closes the return flow connection, before the valve piston releases the high pressure connection for the establishment of the fluid connection with the load connection.

The seal free guidance of the valve piston in the valve seat carrier has the effect that high pressure fluid, which remains continually at high pressure can flow through the non-sealed region between the valve piston and the valve seat carrier immediately after the lifting of the valve piston from the sealing ring, so that in the switching process for opening the valve, owing to the overflow of pressure fluid during the switching process an at least partial pressure equalisation occurs, which has the consequence that the control pressure with which the control piston presses on the valve piston in the sense of an opening movement can be significantly lower than was the case in the previously proposed valves. As a consequence of the overflow of high pressure fluid, beginning already with the lifting of the valve piston from the sealing ring it is possible to close the return flow connection by means of the control piston before the valve piston releases the high pressure connection for the establishment of the fluid connection with the load connection to its full cross section, without pressure peaks during the opening process. This comes about because the high pressure fluid does not stream abruptly into the inside of the valve on the closing of the return flow connection and the further opening movement of the valve piston, but high pressure fluid streams already via the gap between the valve piston and the valve seat carrier and the pressure at the load connection continuously increases with increasing closure of the return flow borings. Although the valve according to the present invention thus appears according to its kinematics as a valve with positive overlap, it belongs in fact according to its method of operation to the valves with negative overlapping, i.e. in closing the return flow the infeed is simultaneously gently opened, so that pressure shocks do not arise or only in much reduced measure and the lifetime of the valve is substantially increased.

An especially simple constructional configuration results if the control piston and the valve piston are joined together. This can be achieved for instance if the control piston is screwed onto the valve piston by means of a threaded connection. It is also possible in this to configure the threaded connection as a separation adjusting mechanism, with which the relative axial positions of the control piston and the valve piston can be changed. By this the point in time at which the high pressure connection is released after the closing of the return flow lines by the valve piston can be varied. This can for instance be effected by the exchangeable arrangement of distance washers between the valve piston and the control piston on the thread root of the threaded connection.

Preferably the control piston preferably has a control piston body as a closing element closing the return flow connection when activated by control fluid under pressure and a control piston shoulder, offset from this, guided in a sealed manner in a control piston guide whereby the control piston body is guided without being sealed in a control piston guide. It is also expedient if the control piston guide is provided with at least one relief hole in the region of the control piston body which is connected to the return flow connection via a relief channel. Both measures ensure an especially light, shock-free operation of the control piston in both the opening and closing processes.

The control piston guide has preferably a diameter which corresponds at least approximately to the diameter of the valve seat carrier, whilst the diameter of the control piston body corresponds at least approximately to the effective opening diameter of the valve cone. By this configuration the directional control valve experiences a pressure equalisation so that for the complete opening of the valve piston essentially the pressure force of its valve closing spring alone has to be overcome and the pressure force of the hydraulic fluid can lift off from the effective surfaces of the control and valve pistons, which are essentially the same size but positioned opposite and with the force balance can remain to the greatest degree without relevance in the switching of the valve. The pressure balance can, of course, also be effected by other suitable means.

Preferably the valve piston is pre-tensioned against the sealing ring by the effect of a closing spring which is arranged in the valve seat carrier. This provides an especially space saving configuration.

The sealing ring can be a plastics material sealing ring in a previously proposed manner. It can expediently be sealed to the valve seat carrier by an interposed O-ring or similar, which effectively prevents the build up of pressure behind the plastics material sealing ring in the closed position of the valve. Preferably the directional control valve is also provided with a control piston sealing ring for the control piston in its open controlled position, which effectively seals the control piston against the inner valve chamber and prevents high pressure fluid flowing by the control piston to the return flow borings in the open position of the valve.

The sealing ring for the valve piston is preferably held in its position in the valve seat carrier by a retaining ring. An especially advantageous configuration results if the control piston sealing ring is configured as an assembly with the retaining ring, where the retaining ring or the control piston sealing ring can comprise a steel sealing ring with a conical sealing surface matched to the front end of the control piston.

The valve piston is preferably axially secured in the valve seat carrier with a spring ring and the control piston is provided with a connecting thread or similar for a disassembly tool. The directional control valve can then be removed as a valve cartridge from its valve housing in the assembly unit where the disassembly tool is screwed onto the control piston or fastened in another suitable manner and then the control piston is pulled out using the disassembly tool, whereby the spring ring lies against the valve seat carrier and pulls this also out of the valve housing.

An example of a hydraulically operated directional control valve made in accordance with the present invention will now be described herein below with reference to the accompanying drawing. The sole FIGURE of the drawing shows a longitudinal section of a directional control valve according to the present invention and a support mechanism, generally indicated at 1 being shown schematically.

The hydraulically operated directional control valve 10 is used for the control of hydraulic cylinders of hydraulic support units, such as find application in face support in underground mining. The valve is configured as a valve cartridge, which is inserted in a cut-out boring 11 of a valve housing 12 and is secured in it by means of a screw cap 13. A distance ring 14, which is supported on the base of the bored hole of the cut-out boring 11 on the one side and on the valve cartridge 10 on the other, ensures the correct axial positioning of the valve cartridge 10 in the valve housing.

A high pressure connection P for the infeed of high pressure fluid and a load connection A, which is connected to the hydraulic cylinder to be operated are provided in the valve housing 12. The valve housing 12 further has a return flow connection T for return flowing hydraulic fluid and a control pressure connection ST via which control pressure fluid is taken to the valve for its operation.

The directional control valve comprises essentially a valve seat carrier 15 with a valve piston 16 guided movably in it and a control piston 18 joined to it by a screw connector 17, which is mounted, longitudinally movable, in a control piston guide 19. The valve piston 16 is provided with a valve cone 20, which in the closed position of the valve shown is pressed by a valve pressure spring 21 accommodated in the valve seat carrier 15, surrounding the valve piston, against a sealing ring 22, which is also accommodated in the valve seat carrier in a matching groove 23 and held there by a steel retaining ring 24. The sealing ring 22 comprising plastics material is sealed against the valve seat carrier 15 by means of an O-ring 44 inserted between it and the sealing ring 22, which, in the closed position of the valve piston 16 shown, effectively prevents the build up of pressure behind the plastics material sealing ring 22 from the high pressure fluid fed in at P.

At the upper end in the drawing of the valve piston 16 away from the valve cone 20 it is sealed against the valve seat carrier by means of a rod seal comprising an O-ring 25 and a seal back-up ring 26. At the cylinder ring 27 of the valve piston, which immediately abuts the valve cone 20, this is guided in the valve seat carrier with little play and without special sealing, so that between the valve piston 16 and the valve seat carrier 15 a narrow gap remains in the region of the cylinder ring, which is indicated by 28.

In a similar manner the control piston is also guided in a sealed manner with a control piston shoulder 29 at its rear, lower in the drawing, end in the control piston guide 19 with an O-ring 30 and a seal back-up ring 31, whilst the forward control piston body 32 partly overlapping the valve piston runs without sealing and with little play 33 in the control piston body guide 34.

As can be well seen from the drawing, the high pressure connection P connects via an annular channel 35 and through openings 36 with the inner space 37 of the valve seat carrier 15 in the closed position of the valve shown. The valve cone 20 is here pressed firmly by the valve pressure spring 21 against the sealing ring 22, comprising a plastics material, so that in this closed position no high pressure fluid can flow from the high pressure connection P to the load connection A or to the return flow connection T. In the position of the valve shown the load connection A is in connection with the return flow connection T via radial borings 38 in the hollow valve piston, an annular gap 39 formed in the control piston body guide 34 and through openings 40 formed in the latter, so that hydraulic fluid flowing back from the load (hydraulic cylinders) can flow from the load connection A through the valve piston 16 and the radial borings arranged in it further through the annular gap and the through openings into the return flow T.

To switch over the valve it is impacted with hydraulic fluid at the control pressure connection ST, which presses the control piston and the valve piston 16 joined firmly to it against the effect of the spiral pressure spring 21. Thereby firstly the valve cone 20 is lifted from the sealing ring 22, which has the consequence that high pressure fluid, which is present at the high pressure connection P, can flow through the narrow gap 28 so that at this stage owing to the possible overflow of high pressure fluid a pressure equalisation can take place.

In the continuation of the sliding motion of the control piston the forward part of the control piston body 32 closes the through openings 40 to the return connection, whereby owing to the play 33 between the control piston body and the control piston body guide the hydraulic fluid present in the annular gap 39 can still flow away. Relief borings 41 in the control piston guide ensure on the part of the control piston a fluid and thereby a pressure equalisation in this region of the valve During the continuing closure of the through openings 40 by the control piston body the fluid pressure in the remaining part of the annular gap 39 above the control piston body rises, since pressure fluid still flows and in an increasing amount via the gap 28 between the valve piston and the valve seat carrier, which can flow away increasingly poorly to the return flow connection. Only when the control piston body has been moved so far that it covers the through openings 40 over their entire cross section, does the cylinder ring 27 reach over the through openings 36 in the valve seat carrier 15 and increasingly frees them with the further opening movement of the valve piston, so that then pressure fluid can flow out of the annular channel 35 through the through openings 36 under the valve cone through the radial borings 38 in the valve piston and from there to the load A.

It can be recognised also that the high pressure of the hydraulic fluid does not now abruptly change the pressure conditions in operation, but that the pressure in the valve rises continuously and gently, since also now hydraulic fluid can flow between the control piston body 32 and the control piston body guide through to the return flow T, as long as the forward end 42 of the control piston body does not abut the retaining ring, which is provided with a sealing cone 43 and lies sealing against it. Only when the component comprising the valve piston and the control piston has been brought completely into its open position in the manner described is the high pressure connection completely separated from the return flow connection so that the high pressure fluid is pumped without loss to the load.

It can be seen from the drawing that the control piston guide has a diameter which corresponds to the diameter of the valve seat carrier. Similarly the diameter of the control piston body and the effective opening diameter of the valve cone are at least approximately the same. Owing to this agreement of diameters a pressure equalisation is attained whereby only a comparatively low control pressure is necessary for opening the valve, which essentially has only to overcome the closing force of the valve pressure spring 21. In the embodiment shown a control pressure of some 100 bar is sufficient for the attainment of a very secure switching process of the valve.

The directional control valve according to the invention can be assembled into a unit comprising all its essential parts as a valve cartridge outside the valve housing. For this the control piston 18 is provided with a disassembly thread 46 at its lower end onto which a disassembly tool (not shown) can be screwed. Using the disassembly tool the entire valve can be drawn out from the valve housing. In doing so a spring ring 45 arranged at the upper end of the valve piston 16 lies against a shoulder 47 on the valve seat guide 15 and takes this out of the housing also in the disassembly.

The invention is not restricted to the embodiment shown and described, but there are several modifications and supplements possible, without departing from the framework of the invention. Thus the concept of the "seal-free guide" of the control piston body and cylinder ring in the individually associated parts of the control piston body guide and the valve seat carrier is to be understood in the general sense that the arrangement permits an overflow of hydraulic fluid from the inner space of the valve seat carrier into the annular gap 39 and from there to the return flow connection T. In individual cases this can, instead of the arrangement with free play, be effected with one or more overflow channels or borings, which in the complete or open position of the valve are closed, after the lifting of the valve cone from the sealing ring or the front end of the control piston body from the control piston sealing ring from the control piston seal are opened and permit an overflow of hydraulic fluid.

What is claimed is:

1. A hydraulically operated directional control valve for support mechanisms in underground mining, with a valve piston guided sliding in a boring of a valve seat carrier with a valve cone to abut in a sealing manner a sealing ring arranged in the valve seat carrier and with a control piston for the actuation of the valve piston accommodated so as to slide in a control piston guide, with a high pressure connection, a load connection, a return flow connection and a control pressure connection for hydraulic fluid, whereby on actuation of the valve piston by the control piston the return flow connection is closed by a closing element of the control piston and following the lifting of the valve cone from the sealing ring a fluid connection is set up from the high pressure connection to the load connection, in which the valve piston is guided without sealing between th high pressure connection and the sealing ring in the valve seat carrier allowing at least partial pressure equalization and in which the closing element of the control piston closes the return fib connection, before the valve piston releases the high pressure connection in full cross-section for the establishment of the fluid connection with the load connection.

2. A directional control valve according to claim 1, in which the control piston and the valve piston are joined together.

3. A directional control valve according to claim 1, in which the control piston is screwed onto the valve piston by means of a threaded connection.

4. A directional control valve according to claim 1, in which the control piston has a control piston body as a closing element closing the return flow connection when actuated by control fluid under pressure and a control piston shoulder, offset from this, guided in a sealed manner in a control piston guide whereby the control piston body is guided without being sealed in a control piston body guide.

5. A directional control valve according to claim 4, in which the control piston guide is provided with at least one relief hole in the region of the control piston body which is connected to the return flow connection via a relief channel.

6. A directional control valve according to claim 4, in which the control piston guide has a diameter which corresponds at least approximately to the diameter of the valve seat carrier and in which the diameter of the control piston body corresponds at least approximately to the effective opening diameter of the valve cone.

7. A directional control valve according to claim 1, in which the valve piston is pre-tensioned against the sealing ring by the effect of a closing spring which is arranged in the valve seat carrier.

8. A directional control valve according to claim 1, in which the sealing ring is a plastics material sealing ring.

9. A directional control valve according to claim 1, in which the sealing ring is sealed against the valve seat carrier by means of an interposed O-ring.

10. A directional control valve according to claim 1, wherein a control piston sealing ring is in sealing engagement with the control piston when the valve is in its open controlled position.

11. A directional control valve according to claim 1, in which the sealing ring is held in its position in the valve seat carrier by a retaining ring.

12. A directional control valve according to claim 11, in which a control piston sealing ring is configured as an assembly with the retaining ring.

13. A directional control valve according to claim 11, in which the assembly of the retaining ring and the control piston sealing ring comprises a steel sealing ring with a conical sealing surface matched to the front end of the control piston.

14. A directional control valve according to claim 1, in which the valve piston is axially secured in the valve seat carrier with a spring ring.

15. A directional control valve according to claim 1, in which the control piston is provided with a connecting thread for a disassembly tool.

16. A support mechanism for underground mining equipped with a hydraulic valve with a valve piston guided sliding in a boring of a valve seat carrier with a valve cone to abut in a sealing manner a pealing ring arranged in the valve seat carrier and with a control piston for the actuation of the valve piston accommodated so as to slide in a control piston guide, with a high pressure connection, a load connection, a return flow connection and a control pressure connection for hydraulic fluid, whereby on actuation of the valve piston by the control piston the return flow connection is closed by a closing element of the control piston and following the lifting of the valve cone from the sealing ring a fluid connection is set up from the high pressure connection to the load connection, in which the valve piston is guided without sealing between the high pressure connection and the sealing ring in the valve seat carrier allowing at least partial pressure equalization and in which the closing element of the control piston closes the return flow connection, before the valve piston releases the high pressure connection in full cross section for the establishment of the fluid connection with the load connection.

* * * * *